Mar. 20, 1923.
F. E. GODFREY
GYNECOLOGICAL FORCEPS
Filed Dec. 6, 1921
1,448,739
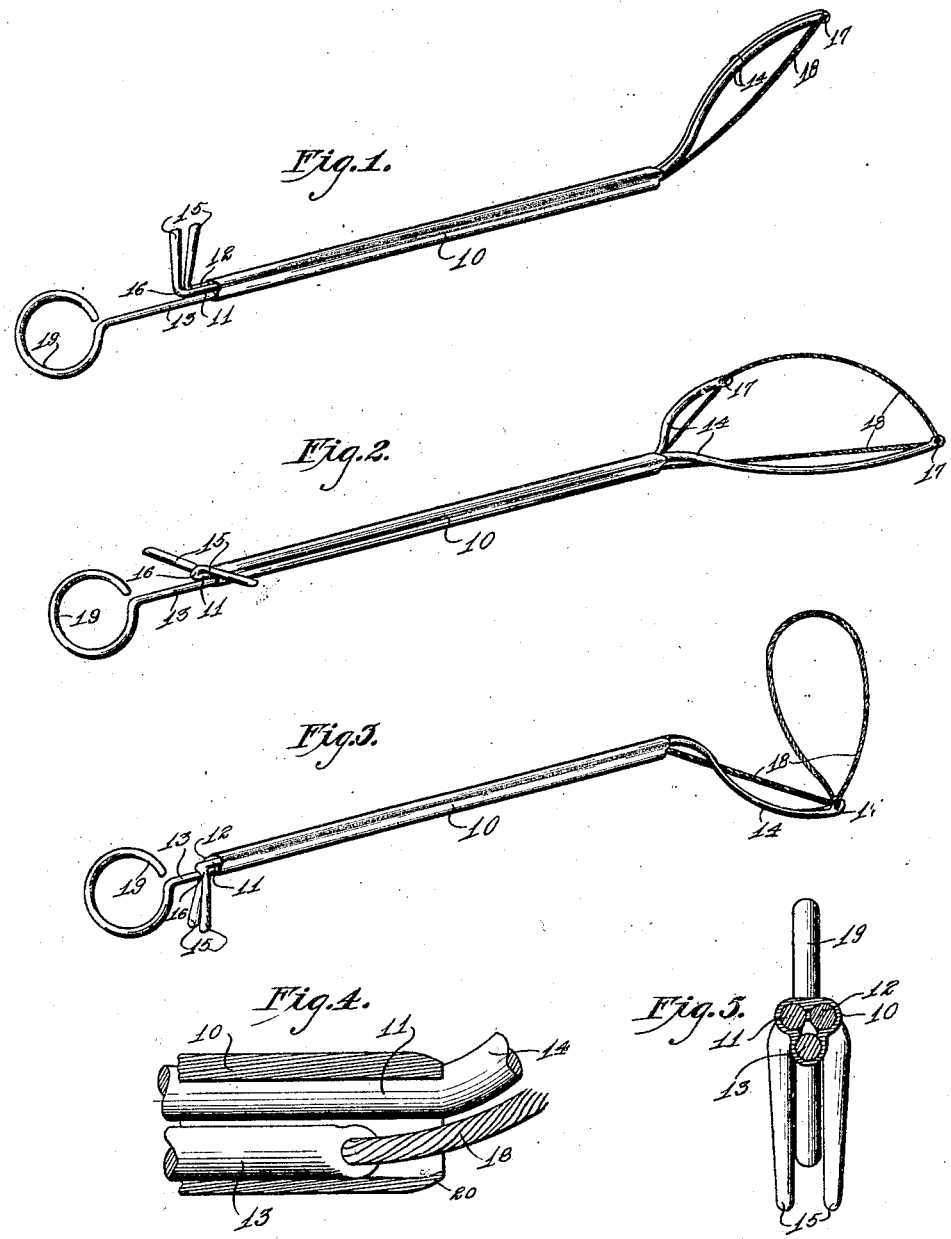
Inventor
Frank E. Godfrey
by Orwig & Hague, Attys.

Patented Mar. 20, 1923.

1,448,739

UNITED STATES PATENT OFFICE.

FRANK E. GODFREY, OF VILLISCA, IOWA.

GYNECOLOGICAL FORCEPS.

Application filed December 6, 1921. Serial No. 520,338.

*To all whom it may concern:*

Be it known that I, FRANK E. GODFREY, a citizen of the United States, and a resident of Villisca, in the county of Montgomery and State of Iowa, have invented a certain new and useful Gynecological Forceps, of which the following is a specification.

The object of my invention is to provide a device of the class described of simple, durable and inexpensive construction especially designed for the removal of pigs or the like in a convenient and facile manner and without danger of injury.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of my improved forceps in closed position.

Figure 2 shows a like view with the forceps in partially opened position.

Figure 3 shows a similar view showing the forceps in position after the animal engaging loop has been formed to encircle the animal to be removed.

Figure 4 shows an enlarged detail sectional view illustrating the outer end of the tube and showing the manner in which the cord engaging rod is slidingly mounted therein, and Figure 5 shows an enlarged detail sectional view through the central portion of the forceps looking toward the handle end.

Referring to the accompanying drawings I have used the reference numeral 10 to indicate the tubular handle body portion in which is rotatably mounted two rods 11 and 12 and also a sliding cord tensioning rod 13, the tubular handle shaped, as shown in Figure 5, to permit the rods 11 and 12 to rotate and the rod 13 to slide and to hold said rods in their respective relative positions.

The two loop forming rods 11 and 12 are each provided at one end with a curved extension 14 and at the other end with a handle 15. These handles are preferably placed one immediately in the rear of the other and are slightly curved as shown at 16 in Figure 3, so that they may be moved from substantially parallel positions, as shown in Figure 1, through a complete half circle to assume the position shown in Figure 3. In each of the curved extensions 14 is an eye 17 through which a cord 18 is passed. This cord has its ends connected to the rod 13, as shown in Figure 4. On the other end of the rod 13 is a handle 19. The end of the tubular body portion 10 adjacent to the cord 18 is preferably rounded, as shown at 20 in Figure 4, to avoid sharp corners.

In practical operation and assuming that the forceps is in the position shown in Figure 1 then obviously it may be easily inserted in position and by pulling upon the handle 19 the cord may be kept taut to prevent it from becoming caught or tangled or twisted, and at the same time securing the two curved extensions 14 in adjacent positions. By moving the two handles 15 in opposite directions the curved extensions 14 are made to separate and as they separate the rod 13 may be permitted to move forwardly in the handle sufficiently to feed the cord through the eye 17 to form a loop, and when the handles 15 have been moved to the position shown in Figure 3, then the loop has been fully formed and yet at all times the cord has been kept taut. When in this position the animal has been firmly grasped in the loop and may be removed.

Longitudinal movement of the two loop forming rods is prevented by the curved arms 14 and the handles 15 because they stand close to opposite ends of the tubular body portion and co-operate with the tubular body portion in preventing such movement.

I claim as my invention:

1. In a forceps of the class described, the combination of a hollow body portion shaped to rotatably support two loop forming rods and to slidingly support a cord tensioning rod, with said rods arranged parallel to each other, two loop forming rods mounted in said body portion, each having at one end a curved extension formed with an eye and at its other end a handle, the curved extension and handle members being arranged to co-operate with the hollow body portion to prevent longitudinal movement of the loop forming rods, a cord passed through the said eyes and inserted into the hollow body portion and attached to the cord tensioning rod, and a handle on the other end of the cord tensioning rod.

2. In a forceps of the class described, the combination of a body portion, two parallel loop forming rods rotatively mounted therein, each of said rods having at one end a curved extension provided with an eye, and each having at the other end a handle, a cord passing through said eyes and having its ends extending into said body portion, and means for pulling the ends of said cords rearwardly through said body portion.

Des Moines, Iowa, November 1, 1921.

FRANK E. GODFREY.